United States Patent
Hsieh et al.

(10) Patent No.: US 11,697,711 B2
(45) Date of Patent: Jul. 11, 2023

(54) RESIN COMPOSITION, PREPARATION METHOD THEREOF AND ARTICLE MADE THEREFROM

(71) Applicant: Elite Material Co., Ltd., Taoyuan (TW)

(72) Inventors: Chen-Yu Hsieh, Taoyuan (TW); Chien-Hsiang Chen, Taoyuan (TW); Yi-Fei Yu, Taoyuan (TW)

(73) Assignee: ELITE MATERIAL CO., LTD., Taoyuan (TW)

( * ) Notice: Subject to any disclaimer, the term of this patent is extended or adjusted under 35 U.S.C. 154(b) by 150 days.

(21) Appl. No.: 17/354,729

(22) Filed: Jun. 22, 2021

(65) Prior Publication Data

US 2022/0380545 A1    Dec. 1, 2022

(30) Foreign Application Priority Data

May 28, 2021   (TW) .................................. 110119374

(51) Int. Cl.

| | | |
|---|---|---|
| C08G 73/12 | (2006.01) | |
| C08L 79/08 | (2006.01) | |
| C08K 5/00 | (2006.01) | |
| C08K 3/013 | (2018.01) | |
| C08G 73/10 | (2006.01) | |

(52) U.S. Cl.
CPC ......... *C08G 73/121* (2013.01); *C08G 73/106* (2013.01); *C08G 73/1071* (2013.01); *C08G 73/124* (2013.01); *C08G 73/126* (2013.01); *C08K 3/013* (2018.01); *C08K 5/0025* (2013.01); *C08K 5/0066* (2013.01); *C08L 79/08* (2013.01)

(58) Field of Classification Search
CPC ............... C08G 73/121; C08G 73/106; C08G 73/1071; C08G 73/124; C08G 73/126; C08K 3/013; C08K 5/0025; C08K 5/0066; C08L 79/08
USPC ....................................................... 528/310
See application file for complete search history.

(56) References Cited

FOREIGN PATENT DOCUMENTS

| | | | | | |
|---|---|---|---|---|---|
| JP | 62246933 | A | * | 10/1987 | ............. C08G 77/42 |
| JP | 2012236920 | A | * | 12/2012 | ............. C08G 59/50 |
| JP | 2018014388 | A | * | 1/2018 | ............... H05K 1/03 |

OTHER PUBLICATIONS

Ueno et al., JP 62-246933 A, machine translation in English, Oct. 28, 1987 (Year: 1987).*
Iwakura et al., JP 2018-014388 A machine translation in English, Jan. 25, 2018 (Year: 2018).*
Hashimoto et al., JP 2012-236920 A machine translation in English, Dec. 6, 2012 (Year: 2012).*

* cited by examiner

*Primary Examiner* — David T Karst
(74) *Attorney, Agent, or Firm* — Muncy, Geissler, Olds & Lowe, P.C.

(57) ABSTRACT

A resin composition includes a prepolymer and an additive, wherein: the prepolymer is prepared from a mixture subjected to a prepolymerization reaction, and the mixture includes 100 parts by weight of a maleimide resin, 15 to 30 parts by weight of a siloxane compound and 4 to 16 parts by weight of a diamine compound; the maleimide resin includes bisphenol A diphenyl ether bismaleimide, 3,3'-dimethyl-5,5'-diethyl-4,4'-diphenylmethane bismaleimide or a combination thereof; the siloxane compound includes a compound of Formula (I), wherein n is an integer of 5 to 40; and the diamine compound includes a compound of Formula (II) or Formula (III). The resin composition is made by using a preparation method. The resin composition may be used to make various articles, such as a prepreg, a resin film, a laminate or a printed circuit board.

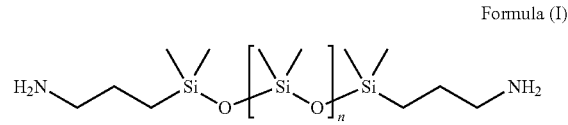

Formula (I)

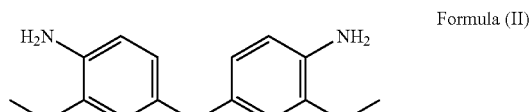

Formula (II)

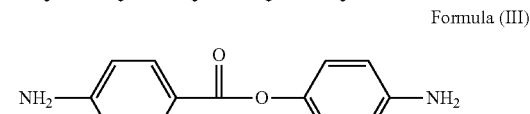

Formula (III)

13 Claims, No Drawings

RESIN COMPOSITION, PREPARATION METHOD THEREOF AND ARTICLE MADE THEREFROM

CROSS-REFERENCE TO RELATED APPLICATION

This application claims the priority benefits of Taiwan Patent Application No. 110119374, filed on May 28, 2021. The entirety the above-mentioned patent application is hereby incorporated by reference herein and made a part of this specification.

BACKGROUND

1. Field of the Disclosure

The present disclosure relates to a resin composition and more particularly to a resin composition useful for preparing a prepreg, a resin film, a laminate or a printed circuit board.

2. Description of Related Art

In recent years, due to the development of electronic signal transmission toward 5G and the trend of miniaturization and high performance of electronic equipment, communication devices and personal computers, circuit boards were also developed toward multi-layer configuration, high density trace interconnection, and high speed signal transmission, thereby presenting higher challenges to the overall performance of circuit laminates such as copper-clad laminates. In order to prevent deformation of copper-clad laminates due to the use of high temperature processes during product fabrication and the abnormal signal transmission resulting from defective products, there is a need for developing materials for copper-clad laminates with lower coefficient of thermal expansion.

Maleimide resins were conventionally used to prepare materials for low thermal expansion copper-clad laminates because maleimide resins have the advantages of high glass transition temperature and low thermal expansion; however, maleimide resins tend to precipitate in the solution of a resin composition over time and cause unstable product quality.

To a material for copper-clad laminates with low dissipation factor and low thermal expansion meeting the strict specification requirements, particularly to a material for copper-clad laminates having a dissipation factor at 10 GHz of less than 0.0080 and an X-axis coefficient of thermal expansion of less than or equal to 8.00 ppm/° C., there is a significant technical difficulty to further lower the X-axis coefficient of thermal expansion of the material by 0.05 ppm/° C.

SUMMARY

To overcome the problems of prior arts, particularly one or more above-mentioned technical problems facing conventional materials, it is a primary object of the present disclosure to provide a resin composition, a preparation method thereof and an article made therefrom which may overcome at least one of the above-mentioned technical problems.

To achieve the above-mentioned objects, the present disclosure provides a resin composition comprising a prepolymer and an additive, wherein:
the prepolymer is prepared from a mixture subjected to a prepolymerization reaction, and the mixture comprises 100 parts by weight of a maleimide resin, 15 to 30 parts by weight of a siloxane compound and 4 to 16 parts by weight of a diamine compound;
the maleimide resin comprises bisphenol A diphenyl ether bismaleimide, 3,3'-dimethyl-5,5'-diethyl-4,4'-diphenylmethane bismaleimide or a combination thereof,
the siloxane compound comprises a compound of Formula (I), wherein n is an integer of 5 to 40; and
the diamine compound comprises a compound of Formula (II) or Formula (III);

Formula (I)

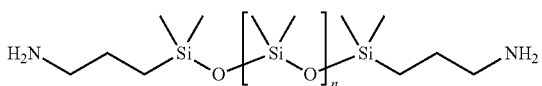

Formula (II)

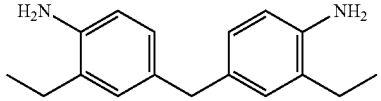

Formula (III)

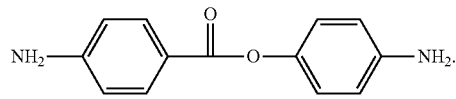

For example, in one embodiment, n is an integer of 10 to 32.

For example, in one embodiment, the mixture further comprises a solvent.

For example, in one embodiment, the mixture is subjected to the prepolymerization reaction at 80° C. to 140° C. for 0.5 to 5 hours to prepare the prepolymer.

For example, in one embodiment, the additive comprises a crosslinking agent which comprises vinyl-containing polyphenylene ether resin, maleimide resin, polyolefin resin, vinyl-containing small molecule compound, acrylate, epoxy resin, cyanate ester resin, phenolic resin, styrene maleic anhydride, polyester resin, amine curing agent, polyamide resin, polyimide resin or a combination thereof.

For example, in one embodiment, relative to 100 parts by weight of the prepolymer, the crosslinking agent comprises 20 to 30 parts by weight of the vinyl-containing polyphenylene ether resin, 15 to 20 parts by weight of the maleimide resin, 5 to 7 parts by weight of the polyolefin resin, 2 to 5 parts by weight of the vinyl-containing small molecule compound or a combination thereof.

For example, in one embodiment, the additive comprises inorganic filler, flame retardant, curing accelerator, polymerization inhibitor, solvent, silane coupling agent, coloring agent, toughening agent or a combination thereof.

To achieve the above-mentioned objects, the present disclosure further provides a method of preparing the aforesaid resin composition, comprising: prepolymerizing the mixture to obtain the prepolymer and then mixing the prepolymer and the additive to obtain the resin composition.

For example, in one embodiment, a varnish made from the resin composition is characterized by the absence of precipitate by visual inspection after standing still at room temperature (about 25° C.) for 72 hours.

For example, in one embodiment, a varnish made from the resin composition is characterized by the absence of layer separation by visual inspection after standing still at room temperature (about 25° C.) for 24 hours.

To achieve the above-mentioned objects, the present disclosure further provides an article made from the resin composition, including a prepreg, a resin film, a laminate or a printed circuit board.

For example, in one embodiment, articles made from the resin composition disclosed herein have one, more or all of the following properties:
a dissipation factor as measured by reference to JIS C2565 at 10 GHz of less than or equal to 0.0075;
an X-axis coefficient of thermal expansion as measured by reference to IPC-TM-650 2.4.24.5 of less than or equal to 6.50 ppm/° C.; and
a copper foil peeling strength as measured by reference to IPC-TM-650 2.4.8 of greater than or equal to 4.00 lb/in.

DESCRIPTION OF THE EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

As used herein, the term "comprises," "comprising," "includes," "including," "encompass," "encompassing," "has," "having" or any other variant thereof is construed as an open-ended transitional phrase intended to cover a non-exclusive inclusion. For example, a composition or article of manufacture that comprises a list of elements is not necessarily limited to only those elements but may include other elements not expressly listed but inherent to such composition or article of manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "encompass," "has," "having" or any other variant thereof, it is understood that transitional phrases such as "consisting essentially of" and "consisting of" are also disclosed and included.

In this disclosure, features or conditions presented as a numerical range or a percentage range are merely for convenience and brevity. Therefore, a numerical range or a percentage range should be interpreted as encompassing and specifically disclosing all possible subranges and individual numerals or values therein, particularly all integers therein. For example, a range of "1 to 8" should be understood as explicitly disclosing all subranges such as 1 to 7, 2 to 8, 2 to 6, 3 to 6, 4 to 8, 3 to 8 and so on, particularly all subranges defined by integers, as well as disclosing all individual values such as 1, 2, 3, 4, 5, 6, 7 and 8. Similarly, a range of "between 1 and 8" should be understood as explicitly disclosing all ranges such as 1 to 8, 1 to 7, 2 to 8, 2 to 6, 3 to 6, 4 to 8, 3 to 8 and so on and encompassing the end points of the ranges. Unless otherwise defined, the aforesaid interpretation rule should be applied throughout the present disclosure regardless broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of $X_1$, $X_2$ and $X_3$," and Y is described as being "selected from a group consisting of $Y_1$, $Y_2$ and $Y_3$," the disclosure shall be interpreted as any combination of X is $X_1$ or $X_2$ or $X_3$ and Y is $Y_1$ or $Y_2$ or $Y_3$.

Unless otherwise specified, according to the present disclosure, a compound refers to a chemical substance formed by two or more elements bonded with chemical bonds and may comprise a small molecule compound and a polymer compound, but not limited thereto. Any compound disclosed herein is interpreted to not only include a single chemical substance but also include a class of chemical substances having the same kind of components or having the same property. In addition, as used herein, a mixture refers to a combination of two or more compounds.

As used herein, a prepolymer refers to a product, derived from a compound or a mixture (monomer) that is subjected to prepolymerization (partial polymerization), contains unreacted reactive functional groups or has the potential to undergo further polymerization. For example, the progress of the prepolymerization reaction may be confirmed and controlled as needed by determining the molecular weight or the level of viscosity. Prepolymerization reaction disclosed herein may be initiated by the use of solvent and heating or by a thermal melting reaction, but not limited thereto. For example, prepolymerization by the use of solvent and heating refers to dissolving the raw material in a solvent, optionally adding a catalyst or a polymerization inhibitor, followed by heating after all components are melted in the solvent, so as to initiate the prepolymerization reaction. Prepolymerization by a thermal melting reaction refers to heating to melt the raw material and at the same time initiate the prepolymerization reaction. The product after prepolymerization (i.e., the prepolymer) has a molecular weight of greater than that of the compound monomer or mixture monomer prior to prepolymerization and may be analyzed by a gel permeation chromatograph (GPC). In the graph of retention time (X-axis) and molecular weight (Y-axis), the distribution peak of molecular weight of the prepolymer is located closer to the Y-axis (shorter retention time), and the distribution peak of molecular weight of the monomer is located behind (longer retention time). In addition, the prepolymer obtained has a wider distribution of molecular weight that contains multiple adjacent peaks, while the monomer has a narrower distribution of molecular weight that contains only one peak.

To those of ordinary skill in the art to which this disclosure pertains, a resin composition containing an additive and three compounds (e.g., A, B and C), a total of four components, is different form a resin composition containing the additive and a prepolymer formed by the three compounds (e.g., A, B and C), a total of two components, as they are completely different from each other in the aspects of preparation method, physical or chemical properties of the resin composition and properties of an article or product made therefrom. For example, the former involves mixing A, B, C and the additive to form the resin composition; in contrast, the latter involves first subjecting a mixture comprising A, B and C to a prepolymerization reaction at proper conditions to form a prepolymer and then mixing the prepolymer with the additive to form the resin composition. For example, to those of ordinary skill in the art to which this disclosure pertains, the two resin compositions have completely different compositions; in addition, because the prepolymer formed by A, B and C functions completely different from A, B and C individually or collectively in the resin composition, the two resin compositions should be construed as completely different chemical substances and have completely different chemical statuses. For example, to those of ordinary skill in the art to which this disclosure pertains, because the two resin compositions are completely different chemical substances, articles made therefrom will not have the same properties. For example, to a resin composition containing an additive and a prepolymer formed by A, B and C, since A, B and C have been partially reacted or converted during the prepolymerization reaction to form the prepolymer, during the process of heating to semi-cure the resin composition at a high temperature condition, a partial crosslinking reaction occurs between the prepolymer and the crosslinking agent but not between the A, B and C individually and the crosslinking agent. As such, articles made from the two resin compositions will be different and have completely different properties.

As used herein, "vinyl-containing" refers to the presence of an ethylenic carbon-carbon double bond (C=C) or a functional group derived therefrom in a compound. Therefore, examples of "vinyl-containing" may include, but not limited to, a structure containing a vinyl group, an allyl group, a vinylbenzyl group, a methacrylate group or the like. Unless otherwise specified, the position of the aforesaid functional group is not particularly limited and may be located at the terminal of a long-chain structure. Therefore, for example, a vinyl-containing polyphenylene ether resin represents a polyphenylene ether resin containing a vinyl group, an allyl group, a vinylbenzyl group, a methacrylate group or the like, but not limited thereto.

As used herein, part(s) by weight represents weight part(s) in any weight unit, such as but not limited to gram, kilogram, pound and so on. For example, 100 parts by weight of the prepolymer may represent 100 grams of the prepolymer, 100 kilograms of the prepolymer or 100 pounds of the prepolymer, but not limited thereto.

The following embodiments and examples are illustrative in nature and are not intended to limit the present disclosure and its application. In addition, the present disclosure is not bound by any theory described in the background and summary above or the following embodiments or examples.

As described above, a main object of the present disclosure is to provide a resin composition, which comprises a prepolymer and an additive, wherein:

the prepolymer is prepared from a mixture subjected to a prepolymerization reaction, and the mixture comprises 100 parts by weight of a maleimide resin, 15 to 30 parts by weight of a siloxane compound and 4 to 16 parts by weight of a diamine compound;

the maleimide resin comprises bisphenol A diphenyl ether bismaleimide, 3,3'-dimethyl-5,5'-diethyl-4,4'-diphenylmethane bismaleimide or a combination thereof, the siloxane compound comprises a compound of Formula (I), wherein n is an integer of 5 to 40; and the diamine compound comprises a compound of Formula (II) or Formula (III);

Formula (I)

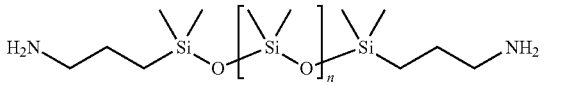

Formula (II)

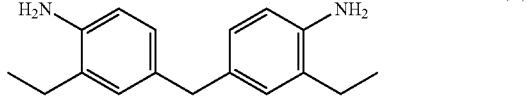

Formula (III)

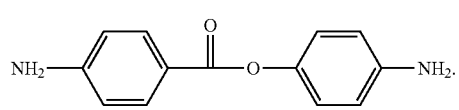

Unless otherwise specified, as used herein, the additive refers to any component useful with the prepolymer to form the resin composition and may be a component with or without the potential of reacting with the prepolymer. For example, in one embodiment, the additive may be a crosslinking agent. For example, in another embodiment, the additive may be an inorganic filler, a flame retardant, a curing accelerator, a polymerization inhibitor, a solvent, a silane coupling agent, a coloring agent, a toughening agent or a combination thereof, but not limited thereto.

In addition to the maleimide resin, the siloxane compound and the diamine compound, the mixture used for preparing the prepolymer may further comprise other component(s).

For example, in one embodiment, the mixture further comprises a solvent used to control the degree of the prepolymerization reaction or the reactivity of the prepolymer. The type and amount of the solvent are not particularly limited and may be determined by those skilled in the art according to the viscosity as needed. For example, the solvent may comprise propylene glycol monomethyl ether acetate, dimethyl acetamide, methyl ethyl ketone, cyclohexanone, N-methyl-2-pyrrolidone or a combination thereof. For example, in one embodiment, relative to 100 parts by weight of the maleimide resin, the solvent may comprise 100 to 300 parts by weight of propylene glycol monomethyl ether acetate. Preferably, relative to 100 parts by weight of the maleimide resin, the solvent may comprise 150 to 250 parts by weight of propylene glycol monomethyl ether acetate, but not limited thereto.

In the present disclosure, the prepolymer is prepared by subjecting the mixture to a prepolymerization reaction. For example, various components in the mixture are well mixed and stirred in the solvent and then heated to 80° C. to 140° C. for reaction for 0.5 to 5 hours to obtain a transparent clear dark brown solution, which is the resinous solution of the prepolymer. For example, the prepolymerization reaction may be carried out at a temperature of 80° C., 90° C., 100°

C., 110° C., 115° C., 120° C., 130° C. or 140° C. For example, the duration of the prepolymerization reaction may be 0.5 hour, 1 hour, 2 hours, 3 hours, 4 hours or 5 hours.

For example, in one embodiment, in addition to the maleimide resin, the siloxane compound and the diamine compound, the mixture may further comprise 2-allylphenol. For example, in one embodiment, relative to 100 parts by weight of the maleimide resin, the mixture may comprise 0.5 to 5 parts by weight of 2-allylphenol.

For example, in one embodiment, the mixture does not contain p-aminophenol.

According to the present disclosure, the maleimide resin suitable for the mixture for preparing the prepolymer comprises bisphenol A diphenyl ether bismaleimide, 3,3'-dimethyl-5,5'-diethyl-4,4'-diphenylmethane bismaleimide or a combination thereof. For example, the maleimide resin may include products such as BMI-4000, BMI-4000H, BMI-5000 and BMI-5100 available from Daiwakasei Co., Ltd., or products such as BMI-70 and BMI-80 available from K.I Chemical Industry Co., Ltd.

According to the present disclosure, the siloxane compound suitable for the mixture for preparing the prepolymer comprises a compound of Formula (I), wherein n is an integer of 5 to 40. For example, n may be 5, 10, 13, 26, 32 or 40, but not limited thereto.

According to the present disclosure, the diamine compound suitable for the mixture for preparing the prepolymer comprises a compound of Formula (II) or Formula (III).

For example, the mixture containing the maleimide resin, the siloxane compound and the diamine compound may be subjected to the prepolymerization reaction under any proper conditions so as to form the prepolymer. In one embodiment, the process for preparing the prepolymer includes dissolving the maleimide resin in a solvent, adding the siloxane compound and the diamine compound and stirring and mixing until fully dissolved, followed by reacting for 0.5 to 5 hours at high temperature (such as 80° C. to 140° C.), so as to obtain the prepolymer.

According to the present disclosure, the method of preparing the aforesaid resin composition comprises: prepolymerizing the mixture to obtain the prepolymer and then mixing the prepolymer and the additive to obtain the resin composition. For example, in one embodiment, the mixture is subjected to the prepolymerization reaction at 80° C. to 140° C. for 0.5 to 5 hours to prepare the prepolymer.

Unless otherwise specified, the amount or ratio of the prepolymer and the additive in the resin composition is not particularly limited. For example, in one embodiment, the resin composition comprises 2 to 60 parts by weight of the additive relative to 100 parts by weight of the prepolymer. For example, in one embodiment, the resin composition comprises 2 to 59 parts by weight of the additive relative to 100 parts by weight of the prepolymer. For example, in one embodiment, the additive comprises a crosslinking agent. Unless otherwise specified, in the resin composition, intermolecular covalent bonds may be formed by the crosslinking agent with the same or different compounds (such as the aforesaid prepolymer), such that the resin composition may undergo a crosslinking reaction under proper conditions to form a more stable structure.

For example, in one embodiment, the crosslinking agent comprises vinyl-containing polyphenylene ether resin, maleimide resin, polyolefin resin, vinyl-containing small molecule compound, acrylate, epoxy resin, cyanate ester resin, phenolic resin, styrene maleic anhydride, polyester resin, amine curing agent, polyamide resin, polyimide resin or a combination thereof.

For example, in one embodiment, relative to 100 parts by weight of the prepolymer, the crosslinking agent comprises 20 to 30 parts by weight of the vinyl-containing polyphenylene ether resin, 15 to 20 parts by weight of the maleimide resin, 5 to 7 parts by weight of the polyolefin resin, 2 to 5 parts by weight of the vinyl-containing small molecule compound or a combination thereof.

As used herein, as an example of the crosslinking agent, the vinyl-containing polyphenylene ether resin represents a polyphenylene ether resin containing a vinyl group, specific examples including but not limited to a polyphenylene ether resin containing a vinyl group, an allyl group, a vinylbenzyl group, or a methacrylate group. For example, in one embodiment, the vinyl-containing polyphenylene ether resin comprises a vinylbenzyl-containing biphenyl polyphenylene ether resin, a methacrylate-containing polyphenylene ether resin (i.e., methacryloyl-containing polyphenylene ether resin), an allyl-containing polyphenylene ether resin, a vinylbenzyl-modified bisphenol A polyphenylene ether resin, a chain-extended vinyl-containing polyphenylene ether resin or a combination thereof. For example, the vinyl-containing polyphenylene ether resin may be a vinylbenzyl-containing biphenyl polyphenylene ether resin with a number average molecular weight of about 1200 (such as OPE-2st 1200, available from Mitsubishi Gas Chemical Co., Inc.), a vinylbenzyl-containing biphenyl polyphenylene ether resin with a number average molecular weight of about 2200 (such as OPE-2st 2200, available from Mitsubishi Gas Chemical Co., Inc.), a methacrylate-containing polyphenylene ether resin with a number average molecular weight of about 1900 to 2300 (such as SA9000, available from Sabic), a vinylbenzyl-modified bisphenol A polyphenylene ether resin with a number average molecular weight of about 2400 to 2800, a chain-extended vinyl-containing polyphenylene ether resin with a number average molecular weight of about 2200 to 3000, or a combination thereof. The chain-extended vinyl-containing polyphenylene ether resin may include various polyphenylene ether resins disclosed in the US Patent Application Publication No. 2016/0185904 A1, all of which are incorporated herein by reference in their entirety.

As used herein, as an example of the crosslinking agent, the maleimide resin comprises bisphenol A diphenyl ether bismaleimide, 3,3'-dimethyl-5,5'-diethyl-4,4'-diphenylmethane bismaleimide or a combination thereof, wherein the specific examples are as described above.

As used herein, as an example of the crosslinking agent, the polyolefin resin comprises but is not limited to: styrene-butadiene-divinylbenzene terpolymer, styrene-butadiene-maleic anhydride terpolymer, vinyl-polybutadiene-urethane oligomer, styrene-butadiene copolymer, hydrogenated styrene-butadiene copolymer (a.k.a. styrene-ethylene-butene-styrene block polymer), styrene-isoprene copolymer, hydrogenated styrene-isoprene copolymer, hydrogenated styrene-butadiene-divinylbenzene terpolymer, polybutadiene (i.e., homopolymer of butadiene), maleic anhydride-butadiene copolymer, methylstyrene copolymer or a combination thereof. Preferably, the polyolefin resin may comprise styrene-butadiene copolymer, hydrogenated styrene-butadiene copolymer, polybutadiene, styrene-butadiene-maleic anhydride terpolymer, maleic anhydride-butadiene copolymer or a combination thereof. For example, the polybutadiene may comprise a polybutadiene without any reactive group, a hydrogenated polybutadiene, a hydroxyl-containing polybutadiene, a phenolic hydroxyl-containing polybutadiene (having a polybutadiene structure and containing a phenolic hydroxyl group), a carboxyl-containing polybutadiene, an anhydride-containing polybutadiene, an epoxy-containing polybutadiene, an isocyanate-containing polybutadiene, an urethane-containing polybutadiene, a hydrogenated polybutadiene with its terminal hydroxyl groups modified by vinyl groups (therefore without any hydroxyl group) or a combination thereof. For example, the polybutadiene may comprise an epoxy-containing polybutadiene.

As used herein, as an example of the crosslinking agent, the vinyl-containing small molecule compound refers to a vinyl-containing compound with a molecular weight of less than or equal to 1000, preferably between 100 and 900 and more preferably between 100 and 800. For example, in one embodiment, the vinyl-containing small molecule compound comprises styrene-based terpolymer, 4,4'-bis[2-(1-propenyl) phenoxy]benzophenone, diallyl bisphenol A, ethyl ether-modified diallyl bisphenol A or a combination thereof.

In addition to the prepolymer and the optional crosslinking agent, the resin composition disclosed herein may also further optionally comprise inorganic filler, flame retardant, curing accelerator, polymerization inhibitor, solvent, silane coupling agent, coloring agent, toughening agent or a combination thereof.

For example, the inorganic filler may be any one or more inorganic fillers suitable for preparing a prepreg, a resin film, a laminate or a printed circuit board, examples including but not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, barium titanate, lead titanate, strontium titanate, calcium titanate, magnesium titanate, barium zirconate, lead zirconate, magnesium zirconate, lead zirconate titanate, zinc molybdate, calcium molybdate, magnesium molybdate, ammonium molybdate, zinc molybdate-modified talc, zinc oxide, zirconium oxide, mica, boehmite (AlOOH), calcined talc, talc, silicon nitride, or calcined kaolin. Moreover, the inorganic filler can be spherical, fibrous, plate-like, particulate, sheet-like or whisker-like in shape and can be optionally pretreated by a silane coupling agent.

For example, the flame retardant used herein may be any one or more flame retardants useful for preparing a prepreg, a resin film, a laminate or a printed circuit board, examples including but not limited to a phosphorus-containing flame retardant, preferably comprising ammonium polyphosphate, hydroquinone bis-(diphenyl phosphate), bisphenol A bis-(diphenylphosphate), tri(2-carboxyethyl) phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, DOPO (9,10-dihydro-9-oxa-10-phosphaphenanthrene-10-oxide) and its derivatives or resins, DPPO (diphenylphosphine oxide) and its derivatives or resins, melamine cyanurate, tri-hydroxy ethyl isocyanurate, aluminium phosphinate (e.g., commercially available OP-930 and OP-935), and a combination thereof.

For example, the flame retardant may be a DPPO compound (e.g., di-DPPO compound, such as commercially available PQ-60), a DOPO compound (e.g., di-DOPO compound), a DOPO resin (e.g., DOPO-HQ, DOPO-NQ, DOPO-PN, and DOPO-BPN) and a DOPO-containing epoxy resin, wherein DOPO-PN is a DOPO phenol novolac compound, and DOPO-BPN may be a DOPO-containing bisphenol novolac compound, such as DOPO-BPAN (DOPO-bisphenol A novolac), DOPO-BPFN (DOPO-bisphenol F novolac) or DOPO-BPSN (DOPO-bisphenol S novolac).

For example, the curing accelerator (including curing initiator) may comprise a catalyst, such as a Lewis base or a Lewis acid. The Lewis base may comprise any one or more of imidazole, boron trifluoride-amine complex, ethyltriphenyl phosphonium chloride, 2-methylimidazole (2MI), 2-phenyl-1H-imidazole (2PZ), 2-ethyl-4-methyl imidazole (2E4MI), triphenylphosphine (TPP) and 4-dimethylaminopyridine (DMAP). The Lewis acid may comprise metal salt compounds, such as those of manganese, iron, cobalt, nickel, copper and zinc, such as zinc octanoate or cobalt octanoate. The curing accelerator also includes a curing initiator, such as a peroxide capable of producing free radicals, examples of curing initiator including but not limited to dicumyl peroxide, tert-butyl peroxybenzoate, dibenzoyl peroxide (BPO), 2,5-dimethyl-2,5-di(tert-butyl peroxy)-3-hexyne peroxide (25B), bis(tert-butylperoxyisopropyl)benzene or a combination thereof.

For example, the polymerization inhibitor may comprise, but not limited to, 1,1-diphenyl-2-picrylhydrazyl radical, methyl acrylonitrile, 2,2,6,6-tetramethyl-1-oxo-piperidine, dithioester, nitroxide-mediated radical, triphenylmethyl radical, metal ion radical, sulfur radical, hydroquinone, 4-methoxyphenol, p-benzoquinone, phenothiazine, p-phenylnaphthylamine, 4-t-butylcatechol, methylene blue, 4,4'-butylidenebis(6-t-butyl-3-methylphenol), 2,2'-methylenebis(4-ethyl-6-t-butylphenol) or a combination thereof. For example, the nitroxide-mediated radical may comprise, but not limited to, nitroxide radicals derived from cyclic hydroxylamines, such as 2,2,6,6-substituted piperidine 1-oxyl free radical, 2,2,5,5-substituted pyrrolidine 1-oxyl free radical or the like. Preferred substitutes include alkyl groups with 4 or fewer carbon atoms, such as methyl group or ethyl group. Examples of the compound containing a nitroxide radical include but are not limited to 2,2,6,6-tetramethylpiperidine 1-oxyl free radical, 2,2,6,6-tetraethylpiperidine 1-oxyl free radical, 2,2,6,6-tetramethyl-4-oxo-piperidine 1-oxyl free radical, 2,2,5,5-tetramethyl pyrrolidine 1-oxyl free radical, 1,1,3,3-tetramethyl-2-isoindoline oxygen radical, N,N-di-tert-butylamine oxygen free radical and so on. Nitroxide radicals may also be replaced by using stable radicals such as galvinoxyl radicals. The polymerization inhibitor suitable for the resin composition of the present disclosure may include products derived from the polymerization inhibitor with its hydrogen atom or group substituted by other atom or group. Examples include products derived from a polymerization inhibitor with its hydrogen atom substituted by an amino group, a hydroxyl group, a carbonyl group or the like.

For example, the solvent suitable for the resin composition of the present disclosure is not particularly limited and may be any solvent suitable for dissolving the resin composition disclosed herein, examples including, but not limited to, methanol, ethanol, ethylene glycol monomethyl ether, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethylformamide, dimethylacetamide, propylene glycol methyl ether, or a mixture thereof.

For example, the silane coupling agent may comprise silane (such as but not limited to siloxane) and may be further categorized according to the functional groups into amino silane, epoxide silane, vinyl silane, acrylate silane, methacrylate silane, hydroxyl silane, isocyanate silane, methacryloxy silane and acryloxy silane.

For example, the coloring agent may comprise but not limited to dye or pigment.

As used herein, the purpose of adding toughening agent is to improve the toughness of the resin composition. For example, the toughening agent may comprise, but not limited to, carboxyl-terminated butadiene acrylonitrile rubber (CTBN rubber), core-shell rubber, or a combination thereof.

The resin composition of various embodiments may be processed to make different articles, such as those suitable for use as components in electronic products, including but not limited to a prepreg, a resin film, a laminate or a printed circuit board.

For example, the resin composition from each embodiment of this disclosure can be used to make a prepreg, which comprises a reinforcement material and a layered structure disposed thereon. The layered structure is formed by heating the resin composition at a high temperature to the semi-cured state (B-stage). Suitable baking temperature for making a prepreg may be for example 120° C. to 180° C., preferably 120° C. to 160° C. The reinforcement material may be any one of a fiber material, woven fabric, and non-woven fabric, and the woven fabric preferably comprises fiberglass fabrics. Types of fiberglass fabrics are not particularly limited and may be any commercial fiberglass fabric used for various printed circuit boards, such as E-glass fabric, D-glass fabric, S-glass fabric, T-glass fabric, L-glass fabric or Q-glass fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pre-treated by a silane coupling agent. The prepreg may be further heated and cured to the C-stage to form an insulation layer.

For example, the resin composition from each embodiment of this disclosure can be used to make a resin film, which is prepared by heating and baking to semi-cure the resin composition. The resin composition may be selectively coated on a polyethylene terephthalate film (PET film), a polyimide film (PI film), a copper foil or a resin-coated copper, followed by heating and baking to semi-cure the resin composition to form the resin film.

For example, the resin composition from each embodiment of this disclosure can be used to make a laminate, which comprises two metal foils and an insulation layer disposed between the metal foils, wherein the insulation layer is made by curing the resin composition at high temperature and high pressure to the C-stage, a suitable curing temperature being for example between 180° C. and 240° C. and preferably between 200° C. and 230° C. and a suitable curing time being 90 to 180 minutes and preferably 120 to 150 minutes. The insulation layer may be formed by curing the aforesaid prepreg or resin film to the C-stage. The metal foil may comprise copper, aluminum, nickel, platinum, silver, gold or alloy thereof, such as a copper foil. In one embodiment, the laminate is a copper-clad laminate (CCL).

In addition, the laminate may be further processed by trace formation processes to make a circuit board, such as a printed circuit board.

In one embodiment, the resin composition disclosed herein may achieve improvement in one or more of the following properties: dissipation factor, X-axis coefficient of thermal expansion, copper foil peeling strength, varnish precipitation property and resin compatibility.

For example, the resin composition according to the present disclosure or the article made therefrom may achieve one, more or all of the following properties:

a varnish (excluding inorganic filler) made from the resin composition is characterized by the absence of precipitate by visual inspection after standing still at room temperature (about 25° C.) for 72 hours;

a varnish (excluding inorganic filler) made from the resin composition is characterized by the absence of layer separation by visual inspection after standing still at room temperature (about 25° C.) for 24 hours;

a dissipation factor as measured by reference to JIS C2565 at 10 GHz of less than or equal to 0.0075, such as between 0.0058 and 0.0075, such as less than or equal to 0.0075, less than or equal to 0.0074, less than or equal to 0.0073, less than or equal to 0.0072, less than or equal to 0.0071, less than or equal to 0.0067, less than or equal to 0.0064, less than or equal to 0.0063, less than or equal to 0.0062, less than or equal to 0.0060 or less than or equal to 0.0058;

an X-axis coefficient of thermal expansion as measured by reference to IPC-TM-650 2.4.24.5 of less than or equal to 6.50 ppm/° C., such as between 5.70 ppm/° C. and 6.50 ppm/° C., such as between 5.72 ppm/° C. and 6.50 ppm/° C., such as less than or equal to 6.50 ppm/° C., less than or equal to 6.40 ppm/° C., less than or equal to 6.39 ppm/° C., less than or equal to 6.25 ppm/° C., less than or equal to 6.23 ppm/° C., less than or equal to 6.12 ppm/° C., less than or equal to 6.05 ppm/° C., less than or equal to 6.02 ppm/° C., less than or equal to 6.01 ppm/° C., less than or equal to 6.00 ppm/° C., less than or equal to 5.96 ppm/° C., less than or equal to 5.95 ppm/° C., less than or equal to 5.90 ppm/° C., less than or equal to 5.89 ppm/° C., less than or equal to 5.84 ppm/° C., less than or equal to 5.81 ppm/° C. or less than or equal to 5.72 ppm/° C.; and a copper foil peeling strength as measured by reference to IPC-TM-650 2.4.8 of greater than or equal to 4.00 lb/in, such as between 4.00 lb/in and 4.30 lb/in, such as between 4.00 lb/in and 4.24 lb/in, such as greater than or equal to 4.00 lb/in, greater than or equal to 4.01 lb/in, greater than or equal to 4.02 lb/in, greater than or equal to 4.03 lb/in, greater than or equal to 4.04 lb/in, greater than or equal to 4.05 lb/in, greater than or equal to 4.06 lb/in, greater than or equal to 4.09 lb/in, greater than or equal to 4.10 lb/in, greater than or equal to 4.12 lb/in or greater than or equal to 4.24 lb/in.

Various prepolymers were prepared according to the amount of major reactants (monomers) listed in Table 1 and Table 2 and the descriptions in Preparation Example 1 to Preparation Example 16. In addition, raw materials below were used to prepare the resin compositions of various Examples and Comparative Examples of the present disclosure according to the amount listed in Table 3 to Table 9 and further fabricated to prepare test samples.

Materials and reagents used in Preparation Examples of prepolymer and Examples and Comparative Examples of resin composition disclosed herein are listed below:

BMI-4000: bisphenol A diphenyl ether bismaleimide (a.k.a. 2,2'-bis-[4-(4-maleimide phenoxy)phenyl]propane), available from Daiwakasei Industry Co., Ltd.

BMI-5100: 3,3'-dimethyl-5,5'-diethyl-4,4'-diphenylmethane bismaleimide, available from Daiwakasei Industry Co., Ltd.
BMI-2300: polyphenylmethane maleimide, available from Daiwakasei Industry Co., Ltd.
NH 30 D: siloxane compound of Formula (I), wherein n is 26 to 32 and the molecular weight is about 2200 to 2600 g/mol, available from WACKER.
NH 15 D: siloxane compound of Formula (I), wherein n is 10 to 13 and the molecular weight is about 1000 to 1200 g/mol, available from WACKER.
Siloxane compound of Formula (IV): as shown below, wherein m is 36 to 40 and the molecular weight is about 2800 to 3100 g/mol, available from Shin Etsu.

Formula (IV)

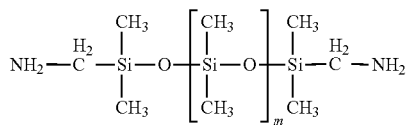

Diamine compound of Formula (II): available from Kingyorker Enterprise Co., Ltd.
Diamine compound of Formula (III): available from UFC Corp.
2-allylphenol: available from TCI.
p-aminophenol: available from Merck.
P-d: bisphenol F type benzoxazine resin, available from Shikoku Chemicals Corp.
TFMB: 4,4'-diamino-2,2'-bis(trifluoromethyl)biphenyl, available from Sigma-Aldrich.
Mosacure 310: 4,4'-methylene bis(2,6-diethylaniline), available from UFC Corp.
OPE-2st 1200: vinylbenzyl-containing polyphenylene ether resin, available from Mitsubishi Gas Chemical Co., Inc.
SA9000: methacrylate-containing polyphenylene ether resin, available from Sabic.
Ricon 100: styrene-butadiene copolymer, available from Cray Valley.
B-1000: polybutadiene, available from Nippon Soda Co., Ltd.
Styrene-based terpolymer: styrene-ethylvinylbenzene-divinylbenzene terpolymer, prepared by Applicant.
TM-123: 4,4'-bis[2-(1-propenyl)phenoxy]benzophenone, available from Evonik.
DABPA: diallyl bisphenol A, available from Daiwakasei Industry Co., Ltd.
DFE983: ethyl ether-modified diallyl bisphenol A (two hydroxyl groups substituted by two ethyl ether groups), available from Sichuan EM Technology Co., Ltd.
25B: 2,5-dimethyl-2,5-di(t-butylperoxy)-3-hexyne, available from NOF Corporation.
P-200: imidazole, available from Mitsubishi Chemical Corporation.
SC-2500 SXJ: spherical silica pre-treated by silane coupling agent, available from Admatechs.
BN: boron nitride, available from 3M.
MAK: methyl n-amyl ketone, commercially available.
MEK: methyl ethyl ketone, commercially available.
Various prepolymers were prepared according to the descriptions in Preparation Example 1 to Preparation Example 16 using the amount of monomers for prepolymerization as listed in Table 1 and Table 2.

Preparation Example 1
In a reaction tank, 186 parts by weight of propylene glycol monomethyl ether acetate, 100 parts by weight of BMI-4000, 18 parts by weight of NH 30 D and 6 parts by weight of the compound of Formula (II) were added, well mixed and dissolved, followed by heating to 115° C. for reaction at the constant temperature for 4 hours, and then cooled to room temperature to obtain a solution of Prepolymer 1 (solid content of 40%) which was in a transparent clear brown color.

Preparation Example 2
Basically the same as Preparation Example 1, except that Preparation Example 2 used 20 parts by weight of NH 30 D and 7 parts by weight of the compound of Formula (II) and a solution of Prepolymer 2 was obtained.

Preparation Example 3
Basically the same as Preparation Example 1, except that Preparation Example 3 used 15 parts by weight of NH 30 D and 4 parts by weight of the compound of Formula (II) and a solution of Prepolymer 3 was obtained.

Preparation Example 4
In a reaction tank, 186 parts by weight of propylene glycol monomethyl ether acetate, 100 parts by weight of BMI-5100, 22 parts by weight of NH 15 D and 8 parts by weight of the compound of Formula (III) were added, well mixed and dissolved, followed by heating to 115° C. for reaction at the constant temperature for 4 hours, and then cooled to room temperature to obtain a solution of Prepolymer 4.

Preparation Example 5
Basically the same as Preparation Example 1, except that Preparation Example 5 used 7.2 parts by weight of the compound of Formula (II) and further added 2 parts by weight of 2-allylphenol and a solution of Prepolymer 5 was obtained.

Preparation Example 6
In a reaction tank, 186 parts by weight of propylene glycol monomethyl ether acetate, 100 parts by weight of BMI-4000, 6 parts by weight of the compound of Formula (IV) and 8 parts by weight of the compound of Formula (II) were added, well mixed and dissolved, followed by heating to 115° C. for reaction at the constant temperature for 4 hours, and then cooled to room temperature to obtain a solution of Prepolymer 6.

Preparation Example 7
Basically the same as Preparation Example 6, except that Preparation Example 7 used 18 parts by weight of the compound of Formula (IV) and 6 parts by weight of the compound of Formula (II) and a solution of Prepolymer 7 was obtained.

Preparation Example 8
In a reaction tank, 186 parts by weight of propylene glycol monomethyl ether acetate, 100 parts by weight of BMI-4000, 18 parts by weight of the compound of Formula (IV) and 6 parts by weight of p-aminophenol were added, well mixed and dissolved, followed by heating to 115° C. for reaction at the constant temperature for 4 hours, and then cooled to room temperature to obtain a solution of Prepolymer 8.

Preparation Example 9
Basically the same as Preparation Example 1, except that Preparation Example 9 did not use the compound of Formula (II) and a solution of Prepolymer 9 was obtained.

Preparation Example 10
Basically the same as Preparation Example 1, except that Preparation Example 10 did not use NH 30 D and a solution of Prepolymer 10 was obtained.

Preparation Example 11

In a reaction tank, 185 parts by weight of methyl ethyl ketone was added, 100 parts by weight of BMI-2300 was then added and dissolved, followed by adding 30 parts by weight of P-d, mixing and stirring. After fully dissolved, the solution was mixed and stirred at 100° C. for reaction for 4 hours to obtain a solution of Prepolymer 11.

Preparation Example 12

100 parts by weight of BMI-2300 was melted to liquid state at 120° C. and then loaded to a reaction tank and mixed and reacted with 15 parts by weight of 4,4'-diamino-2,2'-bis(trifluoromethyl)biphenyl (TFMB) at 90° C. for 3 hours. After the reaction was completed, 40 parts by weight of methyl ethyl ketone was added to the reaction tank and well-stirred to obtain a solution of Prepolymer 12.

Preparation Example 13

100 parts by weight of BMI-2300 was melted to liquid state at 120° C. and then loaded to a reaction tank and mixed and reacted with 35 parts by weight of Mosacure 310 at 90° C. for 3 hours. After the reaction was completed, 40 parts by weight of methyl ethyl ketone was added to the reaction tank and well-stirred to obtain a solution of Prepolymer 13.

Preparation Example 14

Basically the same as Preparation Example 1, except that Preparation Example 14 used 28 parts by weight of NH 30 D and 11 parts by weight of the compound of Formula (II) and a solution of Prepolymer 14 was obtained.

Preparation Example 15

Basically the same as Preparation Example 1, except that Preparation Example 15 used 23 parts by weight of NH 30 D and 16 parts by weight of the compound of Formula (II) and a solution of Prepolymer 15 was obtained.

Preparation Example 16

In a reaction tank, 186 parts by weight of propylene glycol monomethyl ether acetate, 50 parts by weight of BMI-4000, 50 parts by weight of BMI-5100, 15 parts by weight of NH 30 D, 15 parts by weight of NH 15 D and 8 parts by weight of the compound of Formula (II) were added, well mixed and dissolved, followed by heating to 115° C. for reaction at the constant temperature for 4 hours, and then cooled to room temperature to obtain a solution of Prepolymer 16.

TABLE 1

Amount of monomers used in preparing different prepolymers

| | Prepolymer # | | | | | | | |
|---|---|---|---|---|---|---|---|---|
| | 1 | 2 | 3 | 4 | 5 | 6 | 7 | 8 |
| BMI-4000 | 100 | 100 | 100 | | 100 | 100 | 100 | 100 |
| BMI-5100 | | | | 100 | | | | |
| BMI-2300 | | | | | | | | |
| NH 30 D | 18 | 20 | 15 | | 18 | | | |
| NH 15 D | | | | 22 | | | | |
| Formula (IV) | | | | | | 6 | 18 | 18 |
| Formula (II) | 6 | 7 | 4 | | 7.2 | 8 | 6 | |
| Formula (III) | | | | 8 | | | | |
| 2-allylphenol | | | | | 2 | | | |
| p-aminophenol | | | | | | | | 6 |
| P-d | | | | | | | | |
| TFMB | | | | | | | | |
| Mosacure 310 | | | | | | | | |

TABLE 2

Amount of monomers used in preparing different prepolymers

| | Prepolymer # | | | | | | | |
|---|---|---|---|---|---|---|---|---|
| | 9 | 10 | 11 | 12 | 13 | 14 | 15 | 16 |
| BMI-4000 | 100 | 100 | | | | 100 | 100 | 50 |
| BMI-5100 | | | | | | | | 50 |
| BMI-2300 | | | 100 | 100 | 100 | | | |
| NH 30 D | 18 | | | | | 28 | 23 | 15 |
| NH 15 D | | | | | | | | 15 |
| Formula (IV) | | | | | | | | |
| Formula (II) | | 6 | | | | 11 | 16 | 8 |
| Formula (III) | | | | | | | | |
| 2-allylphenol | | | | | | | | |
| p-aminophenol | | | | | | | | |
| P-d | | | 30 | | | | | |
| TFMB | | | | 15 | | | | |
| Mosacure 310 | | | | | 35 | | | |

Compositions (in part by weight) and test results of resin compositions of Examples and Comparative Examples are listed below, wherein the part by weight refers to the amount, in part by weight, of each component with a solid content of 100%. For example, Example E1 contains 100 parts by weight of Prepolymer 1, indicating the amount of Prepolymer 1, with a solid content of 100%, is 100 parts by weight.

TABLE 3

Resin compositions of Examples (in part by weight) and test results

| Component | | E1 | E2 | E3 | E4 | E5 | E6 |
|---|---|---|---|---|---|---|---|
| prepolymer of the disclosure | Prepolymer 1 | 100 | | | | | 30 |
| | Prepolymer 2 | | 100 | | | | 20 |
| | Prepolymer 3 | | | 100 | | | 15 |
| | Prepolymer 4 | | | | 100 | | 15 |
| | Prepolymer 5 | | | | | 100 | 20 |
| | Prepolymer 14 | | | | | | |
| | Prepolymer 15 | | | | | | |
| | Prepolymer 16 | | | | | | |
| other prepolymer | Prepolymer 6 | | | | | | |
| | Prepolymer 7 | | | | | | |
| | Prepolymer 8 | | | | | | |
| | Prepolymer 9 | | | | | | |
| | Prepolymer 10 | | | | | | |
| | Prepolymer 11 | | | | | | |
| | Prepolymer 12 | | | | | | |
| | Prepolymer 13 | | | | | | |

TABLE 3-continued

| | | | | | | | |
|---|---|---|---|---|---|---|---|
| maleimide resin | BMI-4000 | | | | | | |
| | BMI-5100 | | | | | | |
| vinyl-containing polyphenylene ether resin | OPE-2st 1200 | | | | | | |
| | SA9000 | | | | | | |
| siloxane compound | Formula (IV) | | | | | | |
| | NH 30 D | | | | | | |
| polyolefin resin | Ricon 100 | | | | | | |
| | B-1000 | | | | | | |
| vinyl-containing small molecule compound | styrene-based terpolymer | | | | | | |
| | TM-123 | | | | | | |
| | DABPA | | | | | | |
| | DFE983 | | | | | | |
| diamine compound | Formula (II) | | | | | | |
| curing accelerator | 25B | 1 | 1 | 1 | 1 | 1 | 1 |
| | P-200 | | | | | | |
| inorganic filler | SC-2500 SXJ | 200 | 200 | 200 | 200 | 200 | 200 |
| | BN | | | | | | |
| solvent | MAK | 50 | 50 | 50 | 50 | 50 | 50 |
| | MEK | 50 | 50 | 50 | 50 | 50 | 50 |
| Property | Unit | E1 | E2 | E3 | E4 | E5 | E6 |
| Df | none | 0.0073 | 0.0074 | 0.0075 | 0.0071 | 0.0073 | 0.0072 |
| X-CTE | ppm/° C. | 5.90 | 5.95 | 6.00 | 6.50 | 6.05 | 5.89 |
| P/S | lb/in | 4.10 | 4.04 | 4.05 | 4.03 | 4.02 | 4.02 |
| Varnish precipitation property | none | N | N | N | N | N | N |
| PPO compatibility | none | | | | | | |

TABLE 4

Resin compositions of Examples (in part by weight) and test results

| Component | | E7 | E8 | E9 | E10 | E11 | E12 |
|---|---|---|---|---|---|---|---|
| prepolymer of the disclosure | Prepolymer 1 | 30 | 30 | 100 | 100 | 100 | 60 |
| | Prepolymer 2 | 20 | 20 | | | | 20 |
| | Prepolymer 3 | 15 | 15 | | | | |
| | Prepolymer 4 | 15 | 15 | | | | 20 |
| | Prepolymer 5 | 20 | 20 | | | | |
| | Prepolymer 14 | | | | | | |
| | Prepolymer 15 | | | | | | |
| | Prepolymer 16 | | | | | | |
| other prepolymer | Prepolymer 6 | | | | | | |
| | Prepolymer 7 | | | | | | |
| | Prepolymer 8 | | | | | | |
| | Prepolymer 9 | | | | | | |
| | Prepolymer 10 | | | | | | |
| | Prepolymer 11 | | | | | | |
| | Prepolymer 12 | | | | | | |
| | Prepolymer 13 | | | | | | |
| maleimide resin | BMI-4000 | | | | | | 20 |
| | BMI-5100 | | | | | | |
| vinyl-containing polyphenylene ether resin | OPE-2st 1200 | | | 15 | | 15 | 15 |
| | SA9000 | | | 15 | 30 | 15 | 15 |
| siloxane compound | Formula (IV) | | | | | | |
| | NH 30 D | | | | | | |
| polyolefin resin | Ricon 100 | | | | 5 | 2.5 | 3 |
| | B-1000 | | | | | 2.5 | 4 |
| vinyl-containing small molecule compound | styrene-based terpolymer | | | | | | |
| | TM-123 | | | 5 | | | |
| | DABPA | | | | | | |
| | DFE983 | | | | | | 2 |
| diamine compound | Formula (II) | | | | | | |
| curing accelerator | 25B | 1 | 1 | 0.5 | 0.5 | 0.5 | 0.5 |
| | P-200 | | | 0.5 | 0.5 | 0.5 | 0.5 |
| inorganic filler | SC-2500 SXJ | 180 | 220 | 200 | 200 | 200 | 180 |
| | BN | | | | | | 3 |
| solvent | MAK | 50 | 50 | 50 | 50 | 50 | 50 |
| | MEK | 50 | 50 | 50 | 50 | 50 | 50 |

TABLE 4-continued

| Property | Unit | E7 | E8 | E9 | E10 | E11 | E12 |
|---|---|---|---|---|---|---|---|
| Df | none | 0.0072 | 0.0074 | 0.0062 | 0.0064 | 0.0058 | 0.0067 |
| X-CTE | ppm/° C. | 6.01 | 5.84 | 5.96 | 6.40 | 6.39 | 5.81 |
| P/S | lb/in | 4.12 | 4.05 | 4.12 | 4.24 | 4.01 | 4.06 |
| Varnish precipitation property | none | N | N | N | N | N | N |
| PPO compatibility | none | | | OK | OK | OK | OK |

TABLE 5

Resin compositions of Examples (in part by weight) and test results

| Component | | E13 | E14 | E15 | E16 | E17 |
|---|---|---|---|---|---|---|
| prepolymer of the disclosure | Prepolymer 1 | 30 | 30 | | | |
| | Prepolymer 2 | 50 | | | | |
| | Prepolymer 3 | | 50 | | | |
| | Prepolymer 4 | | | | | |
| | Prepolymer 5 | 20 | 20 | | | |
| | Prepolymer 14 | | | 100 | | |
| | Prepolymer 15 | | | | 100 | |
| | Prepolymer 16 | | | | | 100 |
| other prepolymer | Prepolymer 6 | | | | | |
| | Prepolymer 7 | | | | | |
| | Prepolymer 8 | | | | | |
| | Prepolymer 9 | | | | | |
| | Prepolymer 10 | | | | | |
| | Prepolymer 11 | | | | | |
| | Prepolymer 12 | | | | | |
| | Prepolymer 13 | | | | | |
| maleimide resin | BMI-4000 | | | | | |
| | BMI-5100 | 15 | 15 | | | |
| vinyl-containing polyphenylene ether resin | OPE-2st 1200 | 10 | 10 | | | |
| | SA9000 | 10 | 10 | | | |
| siloxane compound | Formula (IV) | | | | | |
| | NH 30 D | | | | | |
| polyolefin resin | Ricon 100 | 2.5 | | | | |
| | B-1000 | 2.5 | | | | |
| vinyl-containing small molecule compound | styrene-based terpolymer | | 5 | | | |
| | TM-123 | | | | | |
| | DABPA | | | | | |
| | DFE983 | 2 | | | | |
| diamine compound | Formula (II) | | | | | |
| curing accelerator | 25B | 0.5 | 0.6 | 1 | 1 | 1 |
| | P-200 | 0.5 | 0.4 | | | |
| inorganic filler | SC-2500 SXJ | 220 | 220 | 200 | 200 | 200 |
| | BN | 3 | 2 | | | |
| solvent | MAK | 50 | 60 | 50 | 50 | 50 |
| | MEK | 50 | 60 | 50 | 50 | 50 |

| Property | Unit | E13 | E14 | E15 | E16 | E17 |
|---|---|---|---|---|---|---|
| Df | none | 0.0063 | 0.0060 | 0.0074 | 0.0074 | 0.0073 |
| X-CTE | ppm/° C. | 5.72 | 6.12 | 6.02 | 6.25 | 6.23 |
| P/S | lb/in | 4.04 | 4.00 | 4.01 | 4.12 | 4.09 |
| Varnish precipitation property | none | N | N | N | N | N |
| PPO compatibility | none | OK | OK | | | |

TABLE 6

Resin compositions of Comparative Examples (in part by weight) and test results

| Component | | C1 | C2 | C3 | C4 | C5 | C6 |
|---|---|---|---|---|---|---|---|
| prepolymer of the disclosure | Prepolymer 1 | | | | | | |
| | Prepolymer 2 | | | | | | |
| | Prepolymer 3 | | | | | | |

TABLE 6-continued

| | | C1 | C2 | C3 | C4 | C5 | C6 |
|---|---|---|---|---|---|---|---|
| other prepolymer | Prepolymer 4 | | | | | | |
| | Prepolymer 5 | | | | | | |
| | Prepolymer 14 | | | | | | |
| | Prepolymer 15 | | | | | | |
| | Prepolymer 16 | | | | | | |
| | Prepolymer 6 | 100 | | | | | |
| | Prepolymer 7 | | 100 | | | | |
| | Prepolymer 8 | | | 100 | | | |
| | Prepolymer 9 | | | | 100 | | |
| | Prepolymer 10 | | | | | 100 | |
| | Prepolymer 11 | | | | | | 100 |
| | Prepolymer 12 | | | | | | |
| | Prepolymer 13 | | | | | | |
| maleimide resin | BMI-4000 | | | | | | |
| | BMI-5100 | | | | | | |
| vinyl-containing polyphenylene ether resin | OPE-2st 1200 | | | | | | |
| | SA9000 | | | | | | |
| siloxane compound | Formula (IV) | | | | | | |
| | NH 30 D | | | | | | |
| polyolefin resin | Ricon 100 | | | | | | |
| | B-1000 | | | | | | |
| vinyl-containing small molecule compound | styrene-based terpolymer | | | | | | |
| | TM-123 | | | | | | |
| | DABPA | | | | | | |
| | DFE983 | | | | | | |
| diamine compound | Formula (II) | | | | | | |
| curing accelerator | 25B | 1 | 1 | 1 | 1 | 1 | 1 |
| | P-200 | | | | | | |
| inorganic filler | SC-2500 SXJ | 200 | 200 | 200 | 200 | 200 | 200 |
| | BN | | | | | | |
| solvent | MAK | 50 | 50 | 50 | 50 | 50 | 50 |
| | MEK | 50 | 50 | 50 | 50 | 50 | 50 |

| Property | Unit | C1 | C2 | C3 | C4 | C5 | C6 |
|---|---|---|---|---|---|---|---|
| Df | none | 0.0077 | 0.0078 | 0.0079 | 0.0085 | 0.0083 | 0.0093 |
| X-CTE | ppm/°C. | 6.34 | 6.35 | 6.31 | 6.95 | 7.89 | 7.93 |
| P/S | lb/in | 3.78 | 3.81 | 3.75 | 3.56 | 3.93 | 4.57 |
| Varnish precipitation property | none | N | N | N | N | N | N |
| PPO compatibility | none | | | | | | |

TABLE 7

Resin compositions of Comparative Examples (in part by weight) and test results

| Component | | C7 | C8 | C9 | C10 | C11 | C12 |
|---|---|---|---|---|---|---|---|
| prepolymer of the disclosure | Prepolymer 1 | | | | | | |
| | Prepolymer 2 | | | | | | |
| | Prepolymer 3 | | | | | | |
| | Prepolymer 4 | | | | | | |
| | Prepolymer 5 | | | | | | |
| | Prepolymer 14 | | | | | | |
| | Prepolymer 15 | | | | | | |
| | Prepolymer 16 | | | | | | |
| other prepolymer | Prepolymer 6 | | | | | | |
| | Prepolymer 7 | | | | | | |
| | Prepolymer 8 | | | | | | |
| | Prepolymer 9 | | | | | 95 | |
| | Prepolymer 10 | | | | | | 85 |
| | Prepolymer 11 | | | | | | |
| | Prepolymer 12 | 100 | | | | | |
| | Prepolymer 13 | | 100 | | | | |
| maleimide resin | BMI-4000 | | | 80 | 80 | | |
| | BMI-5100 | | | | | | |
| vinyl-containing polyphenylene ether resin | OPE-2st 1200 | | | | | | |
| | SA9000 | | | | | | |
| siloxane compound | Formula (IV) | | | | 15 | | |
| | NH 30 D | | | 15 | | | 15 |
| polyolefin resin | Ricon 100 | | | | | | |
| | B-1000 | | | | | | |

TABLE 7-continued

| | | | | | | | |
|---|---|---|---|---|---|---|---|
| vinyl-containing small molecule compound | styrene-based terpolymer TM-123 DABPA DFE983 | | | | | | |
| diamine compound | Formula (II) | | | 5 | 5 | 5 | |
| curing accelerator | 25B | 1 | 1 | 1 | 1 | 1 | 1 |
| | P-200 | | | | | | |
| inorganic filler | SC-2500 SXJ BN | 200 | 200 | 200 | 200 | 200 | 200 |
| solvent | MAK | 50 | 50 | 50 | 50 | 50 | 50 |
| | MEK | 50 | 50 | 50 | 50 | 50 | 50 |

| Property | Unit | C7 | C8 | C9 | C10 | C11 | C12 |
|---|---|---|---|---|---|---|---|
| Df | none | 0.0068 | 0.0088 | 0.0078 | 0.0078 | 0.0077 | 0.0081 |
| X-CTE | ppm/°C. | 8.56 | 7.76 | 8.36 | 8.37 | 7.56 | 8.96 |
| P/S | lb/in | 3.65 | 4.23 | 3.95 | 3.87 | 3.91 | 4.01 |
| Varnish precipitation property | none | N | N | Y | Y | N | Y |
| PPO compatibility | none | | | | | | |

TABLE 8

Resin compositions of Comparative Examples (in part by weight) and test results

| Component | | C13 | C14 | C15 | C16 | C17 |
|---|---|---|---|---|---|---|
| prepolymer of the disclosure | Prepolymer 1 | | | | | |
| | Prepolymer 2 | | | | | |
| | Prepolymer 3 | | | | | |
| | Prepolymer 4 | | | | | |
| | Prepolymer 5 | | | | | |
| | Prepolymer 14 | | | | | |
| | Prepolymer 15 | | | | | |
| | Prepolymer 16 | | | | | |
| other prepolymer | Prepolymer 6 | 100 | | | | |
| | Prepolymer 7 | | 100 | | | |
| | Prepolymer 8 | | | 100 | | |
| | Prepolymer 9 | | | | 100 | |
| | Prepolymer 10 | | | | | |
| | Prepolymer 11 | | | | | |
| | Prepolymer 12 | | | | | |
| | Prepolymer 13 | | | | | |
| maleimide resin | BMI-4000 | | | | | 80 |
| | BMI-5100 | | | | | |
| vinyl-containing polyphenylene ether resin | OPE-2st 1200 | 15 | 15 | 15 | 15 | 30 |
| | SA9000 | 15 | 15 | 15 | 15 | |
| siloxane compound | Formula (IV) | | | | | |
| | NH 30 D | | | | | 15 |
| polyolefin resin | Ricon 100 | 2.5 | 2.5 | 2.5 | 2.5 | 2.5 |
| | B-1000 | 2.5 | 2.5 | 2.5 | 2.5 | 2.5 |
| vinyl-containing small molecule compound | styrene-based terpolymer TM-123 DABPA DFE983 | | | | | |
| diamine compound | Formula (II) | | | | | 5 |
| curing accelerator | 25B | 0.5 | 0.5 | 0.5 | 0.5 | 0.5 |
| | P-200 | 0.5 | 0.5 | 0.5 | 0.5 | 0.5 |
| inorganic filler | SC-2500 SXJ BN | 200 | 200 | 200 | 200 | 200 |
| solvent | MAK | 50 | 50 | 50 | 50 | 50 |
| | MEK | 50 | 50 | 50 | 50 | 50 |

| Property | Unit | C13 | C14 | C15 | C16 | C17 |
|---|---|---|---|---|---|---|
| Df | none | 0.0062 | 0.0071 | 0.0073 | 0.0075 | 0.0082 |
| X-CTE | ppm/°C. | 6.87 | 6.63 | 6.91 | 6.95 | 8.84 |
| P/S | lb/in | 4.23 | 3.93 | 3.92 | 3.56 | 3.66 |
| Varnish precipitation property | none | N | N | N | N | Y |
| PPO compatibility | none | OK | OK | NG | NG | crystal |

TABLE 9

Resin compositions of Comparative Examples (in part by weight) and test results

| Component | | C18 | C19 | C20 |
|---|---|---|---|---|
| prepolymer of the disclosure | Prepolymer 1 | | | |
| | Prepolymer 2 | | | |
| | Prepolymer 3 | | | |
| | Prepolymer 4 | | | |
| | Prepolymer 5 | | | |
| | Prepolymer 14 | | | |
| | Prepolymer 15 | | | |
| | Prepolymer 16 | | | |
| other prepolymer | Prepolymer 6 | | 100 | |
| | Prepolymer 7 | | | 100 |
| | Prepolymer 8 | | | |
| | Prepolymer 9 | 95 | | |
| | Prepolymer 10 | | | |
| | Prepolymer 11 | | | |
| | Prepolymer 12 | | | |
| | Prepolymer 13 | | | |
| maleimide resin | BMI-4000 | | | |
| | BMI-5100 | | 15 | 15 |
| vinyl-containing polyphenylene ether resin | OPE-2st 1200 | 30 | 10 | 10 |
| | SA9000 | | 10 | 10 |
| siloxane compound | Formula (IV) | | | |
| | NH 30 D | 15 | | |
| polyolefin resin | Ricon 100 | 2.5 | 2.5 | 2.5 |
| | B-1000 | 2.5 | 2.5 | 2.5 |
| vinyl-containing small molecule compound | styrene-based terpolymer | | | |
| | TM-123 | | | |
| | DABPA | | 2 | 2 |
| | DFE983 | | | |
| diamine compound | Formula (II) | 5 | | |
| curing accelerator | 25B | 0.5 | 0.5 | 0.5 |
| | P-200 | 0.5 | 0.5 | 0.5 |
| inorganic filler | SC-2500 SXJ | 200 | 220 | 220 |
| | BN | | | |
| solvent | MAK | 50 | 50 | 50 |
| | MEK | 50 | 50 | 50 |

| Property | Unit | C18 | C19 | C20 |
|---|---|---|---|---|
| Df | none | 0.0081 | 0.0081 | 0.0083 |
| X-CTE | ppm/° C. | 7.81 | 6.71 | 6.72 |
| P/S | lb/in | 3.84 | 4.00 | 4.01 |
| Varnish precipitation property | none | Y | N | N |
| PPO compatibility | none | NG | OK | OK |

Samples (specimens) for the properties measured above were prepared as described below and tested and analyzed under specified conditions below.

Prepreg: Resin composition (in part by weight) from each Example (E1-E17) or each Comparative Example (C1-C20) was separately added to a stirred tank and well-mixed to form a varnish. Then the varnish was loaded to an impregnation tank, and a fiberglass fabric (e.g., 2116 E-glass fiber fabric, available from Asahi) was impregnated into the impregnation tank to adhere the resin composition onto the fiberglass fabric, followed by heating and baking at 150-160° C. for about 3 minutes to obtain a prepreg.

Copper-containing laminate (i.e., copper-clad laminate, formed by lamination of two prepregs): Two 18 μm RTF (reverse treatment foil) copper foils and two prepregs obtained from 2116 E-glass fiber fabrics impregnated with each Example or Comparative Example were prepared, each prepreg having a resin content of about 55%. A copper foil, two prepregs and a copper foil were superimposed in such order and then subjected to a vacuum condition for lamination at 46 kgf/cm² pressure and 230° C. for 120 minutes to form each copper-containing laminate sample. Insulation layers were formed by laminating two sheets of prepreg between the two copper foils, and the resin content of the insulation layers is about 55%.

Copper-free laminate (formed by lamination of two prepregs): Each aforesaid copper-containing laminate (formed by lamination of two prepregs) was etched to remove the two copper foils to obtain a copper-free laminate (formed by lamination of two prepregs) having a resin content of about 55%.

Test items and test methods are described below.

Varnish Precipitation Property

In the measurement of varnish precipitation property, a varnish was prepared from the components of the resin composition (excluding inorganic filler) of each Example or Comparative Example; i.e., the varnish in this test did not contain inorganic filler. The varnish was mixed and stirred and then placed in a transparent glass bottle and stood still at room temperature (about 25° C.) for 72 hours; after that, the varnish was observed with naked eyes to determine whether solid state or semi-solid state precipitates exist, wherein semi-solid state refers to a state between solid state and liquid state. If a precipitate in solid state or semi-solid state of 0.2 mm or larger was observed, a designation of "Y" was given; otherwise a designation of "N" was given.

Resin Compatibility

In the measurement of resin compatibility, a resin composition containing the prepolymer and other resinous component (e.g., polyphenylene ether, abbreviated as PPO or PPE) was observed to determine whether layer separation or crystal precipitation occurs. A varnish was prepared from the components of the resin composition (excluding inorganic filler) of each Example from E9 to E14 or Comparative Example from C13 to C20; i.e., the varnish in this test did not contain inorganic filler. The varnish was mixed and stirred and then placed in a transparent glass bottle and stood still at room temperature (about 25° C.) for 24 hours; after that, the varnish was observed with naked eyes to determine whether layer separation occurs at the surface of the varnish. If layer separation was observed (i.e., one or more interfaces were formed by the varnish), a designation of "NG" was given; if a crystal precipitate of 0.2 mm or larger was formed, a designation of "crystal" was given; if no layer separation was observed and no crystal precipitate was formed, a designation of "OK" was given.

Dissipation Factor (Df)

The aforesaid copper-free laminate (obtained by laminating two prepregs, having a resin content of about 55%) was subjected to dissipation factor measurement. Each sample was measured by using a microwave dielectrometer (available from AET Corp.) by reference to JIS C2565 at room temperature (about 25° C.) and under a 10 GHz frequency. Lower dissipation factor represents better dielectric properties of the sample. Given that a dissipation factor measured at 10 GHz is less than 0.0080 and an X-axis coefficient of thermal expansion is less than or equal to 8.00 ppm/° C., a difference in dissipation factor of less than or equal to 0.0001 represents no substantial difference (no significant technical difficulty) in dissipation factor in different laminates, and a difference in dissipation factor of greater than 0.0001 represents a substantial difference (i.e., significant technical difficulty) in dissipation factor in different laminates. For example, articles made from the resin composition disclosed herein, as measured by reference to JIS C2565 at 10 GHz and at room temperature (about 25° C.), have a dissipation factor of less than or equal to 0.0075, such as between 0.0058 and 0.0075.

X-Axis Coefficient of Thermal Expansion (X-CTE)

The copper-free laminate (obtained by laminating two prepregs) sample was tested by thermal mechanical analysis (TMA) during the measurement of X-axis coefficient of thermal expansion. The copper-free laminate was cut into a sample with a length of 10 mm and a width of 10 mm. Each sample was heated from 35° C. to 300° C. at a heating rate of 10° C./minute and then subjected to the measurement of the coefficient of thermal expansion (ppm/° C.) in X-axis in a temperature range (designated as al) of 40° C. to 125° C. by reference to IPC-TM-650 2.4.24.5. Lower X-axis coefficient of thermal expansion represents a better dimensional expansion property. Given that a dissipation factor measured at 10 GHz is less than 0.0080 and an X-axis coefficient of thermal expansion is less than or equal to 8.00 ppm/° C., a difference in X-axis coefficient of thermal expansion of greater than or equal to 0.05 ppm/° C. represents a substantial difference (i.e., significant technical difficulty) in X-axis coefficient of thermal expansion in different laminates. Given that a dissipation factor measured at 10 GHz is less than 0.0080 and an X-axis coefficient of thermal expansion is greater than 8.00 ppm/° C., a difference in X-axis coefficient of thermal expansion of greater than or equal to 0.10 ppm/° C. represents a substantial difference (i.e., significant technical difficulty) in X-axis coefficient of thermal expansion in different laminates. For example, articles made from the resin composition disclosed herein have an X-axis coefficient of thermal expansion as measured by reference to IPC-TM-650 2.4.24.5 of less than or equal to 6.50 ppm/° C., such as between 5.70 ppm/° C. and 6.50 ppm/° C. or between 5.72 ppm/° C. and 6.50 ppm/° C.

Copper Foil Peeling Strength (a.k.a. Peeling Strength, P/S)

The copper-containing laminate (obtained by laminating two prepregs) was cut into a rectangular specimen with a width of 24 mm and a length of greater than 60 mm, which was etched to remove surface copper foil, leaving a rectangular copper foil with a width of 3.18 mm and a length of greater than 60 mm, and tested by using a tensile strength tester by reference to IPC-TM-650 2.4.8 at room temperature (about 25° C.) to measure the force (lb/in) required to separate the copper foil from the insulation layer of the laminate. In the technical field to which the present disclosure pertains, higher copper foil peeling strength is better. Given that a dissipation factor measured at 10 GHz is less than 0.0080 and an X-axis coefficient of thermal expansion is less than or equal to 8.00 ppm/° C., a difference in copper foil peeling strength of greater than 0.05 lb/in represents a substantial difference (i.e., significant technical difficulty) in copper foil peeling strength in different laminates. For example, articles made from the resin composition disclosed herein have a copper foil peeling strength as measured by reference to IPC-TM-650 2.4.8 of greater than or equal to 4.00 lb/in, such as between 4.00 lb/in and 4.30 lb/in or between 4.00 lb/in and 4.24 lb/in.

The following observations can be made from Table 3 to Table 9.

In contrast with examples using the prepolymer (Examples E1-E5 and E15-E17) formed by the maleimide resin, the siloxane compound and the diamine compound disclosed herein or using a combination of the aforesaid prepolymers (Examples E6-E8), Comparative Examples C1-C8 use a different prepolymer and fail to achieve satisfactory results in at least one property including dissipation factor, X-axis coefficient of thermal expansion and copper foil peeling strength.

From Comparative Examples C9 and C10, it can be observed that if the maleimide resin, the siloxane compound and the diamine compound, without being subjected to a prepolymerization reaction in advance, are added individually to the resin composition, several properties fail to achieve satisfactory results including dissipation factor, X-axis coefficient of thermal expansion, copper foil peeling strength and varnish precipitation property. From Comparative Example C17, it can also be observed that if the maleimide resin, the siloxane compound and the diamine compound, without being subjected to a prepolymerization reaction in advance, are added individually to the resin composition, even with the addition of other resin components, several properties fail to achieve satisfactory results including dissipation factor, X-axis coefficient of thermal expansion, copper foil peeling strength, varnish precipitation property and resin compatibility.

Other the other hand, from Comparative Examples C11 and C12, it can be observed that if two components chosen from the group of the maleimide resin, the siloxane compound and the diamine compound are prepolymerized while the other one component is added individually to the resin composition without being subjected to the prepolymerization reaction, at least three of different properties fail to achieve satisfactory results, including dissipation factor, X-axis coefficient of thermal expansion, copper foil peeling strength and varnish precipitation property.

From the side-by-side comparison of Example E11 and Comparative Examples C13-C16, it can be observed that even with the addition of other resin components, resin compositions using a different prepolymer from the one disclosed herein, such as Comparative Examples C13-C16, still fail to achieve satisfactory results in at least one property including X-axis coefficient of thermal expansion, copper foil peeling strength and resin compatibility.

A comparison of Examples E1 to E17 and Comparative Examples C1 to C20 shows that Examples E1 to E17 can all achieve at the same time a lower dissipation factor (a dissipation factor as measured by reference to JIS C2565 at 10 GHz of less than or equal to 0.0075), a lower X-axis coefficient of thermal expansion (an X-axis coefficient of thermal expansion as measured by reference to IPC-TM-650 2.4.24.5 of less than or equal to 6.50 ppm/° C.) and a higher copper foil peeling strength (a copper foil peeling strength as measured by reference to IPC-TM-650 2.4.8 of greater than or equal to 4.00 lb/in). In addition, a varnish (excluding inorganic filler) prepared from Examples E1 to E17 is absent of precipitate by visual inspection after standing still at room temperature (about 25° C.) for 72 hours and is absent of layer separation by visual inspection after standing still at room temperature (about 25° C.) for 24 hours. In contrast, Comparative Examples C1 to C20 fail to achieve one or more desirable properties described above.

The above detailed description is merely illustrative in nature and is not intended to limit the embodiments of the subject matter or the application and use of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. A resin composition comprising a prepolymer and an additive, wherein:
    the prepolymer is prepared from a mixture subjected to a prepolymerization reaction, and the mixture comprises 100 parts by weight of a maleimide resin, 15 to 30 parts by weight of a siloxane compound and 4 to 16 parts by weight of a diamine compound;
    the maleimide resin comprises bisphenol A diphenyl ether bismaleimide, 3,3'-dimethyl-5,5'-diethyl-4,4'-diphenylmethane bismaleimide or a combination thereof,
    the siloxane compound comprises a compound of Formula (I), wherein n is an integer of 5 to 40; and
    the diamine compound comprises a compound of Formula (II) or Formula (III);

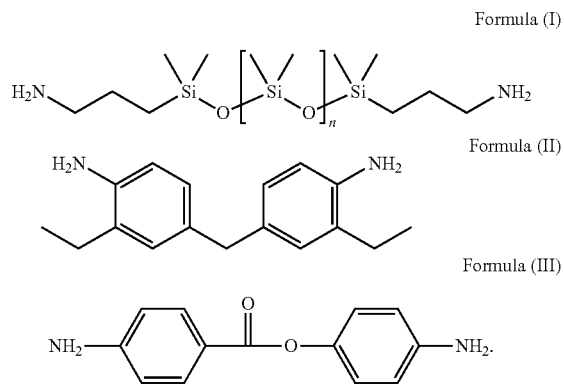

2. The resin composition of claim 1, wherein n is an integer of 10 to 32.

3. The resin composition of claim 1, wherein the mixture further comprises a solvent.

4. The resin composition of claim 1, wherein the mixture is subjected to the prepolymerization reaction at 80° C. to 140° C. for 0.5 to 5 hours to prepare the prepolymer.

5. The resin composition of claim 1, wherein the additive comprises a crosslinking agent which comprises vinyl-containing polyphenylene ether resin, maleimide resin, polyolefin resin, vinyl-containing small molecule compound, acrylate, epoxy resin, cyanate ester resin, phenolic resin, styrene maleic anhydride, polyester resin, amine curing agent, polyamide resin, polyimide resin or a combination thereof.

6. The resin composition of claim 5, wherein relative to 100 parts by weight of the prepolymer, the crosslinking agent comprises 20 to 30 parts by weight of the vinyl-containing polyphenylene ether resin, 15 to 20 parts by weight of the maleimide resin, 5 to 7 parts by weight of the polyolefin resin, 2 to 5 parts by weight of the vinyl-containing small molecule compound or a combination thereof.

7. The resin composition of claim 1, wherein the additive comprises inorganic filler, flame retardant, curing accelerator, polymerization inhibitor, solvent, silane coupling agent, coloring agent, toughening agent or a combination thereof.

8. A method of preparing the resin composition of claim 1, comprising: prepolymerizing the mixture to obtain the prepolymer and then mixing the prepolymer and the additive to obtain the resin composition.

9. The method of claim 8, wherein the mixture is subjected to the prepolymerization reaction at 80° C. to 140° C. for 0.5 to 5 hours to prepare the prepolymer.

10. An article made from the resin composition of claim 1, comprising a prepreg, a resin film, a laminate or a printed circuit board.

11. The article of claim 10, which is a laminate having a dissipation factor as measured by reference to JIS C2565 at 10 GHz of less than or equal to 0.0075.

12. The article of claim 10, which is a laminate having an X-axis coefficient of thermal expansion as measured by reference to IPC-TM-650 2.4.24.5 of less than or equal to 6.50 ppm/° C.

13. The article of claim 10, which is a laminate having a copper foil peeling strength as measured by reference to IPC-TM-650 2.4.8 of greater than or equal to 4.00 lb/in.